(12) United States Patent
Tyler

(10) Patent No.: US 7,328,761 B1
(45) Date of Patent: Feb. 12, 2008

(54) STEERABLE TRAILER DRIVE ASSEMBLY

(76) Inventor: James H. Tyler, 35 Casino La., Franklinton, NC (US) 27525

( * ) Notice: Subject to any disclaimer, the term of this patent is extended or adjusted under 35 U.S.C. 154(b) by 198 days.

(21) Appl. No.: 11/161,664

(22) Filed: Aug. 11, 2005

Related U.S. Application Data

(60) Provisional application No. 60/602,386, filed on Aug. 18, 2004.

(51) Int. Cl.
*B62M 7/14* (2006.01)
(52) U.S. Cl. .................... 180/13; 180/14.2; 180/11
(58) Field of Classification Search ................ 180/11, 180/12, 13, 19.1, 19.2, 19.3, 14.2; 74/489
See application file for complete search history.

(56) References Cited

U.S. PATENT DOCUMENTS

| | | | | |
|---|---|---|---|---|
| 3,783,960 A | * | 1/1974 | Feliz .......................... | 180/14.2 |
| 4,607,733 A | * | 8/1986 | Dodge ........................ | 477/194 |
| 4,860,841 A | * | 8/1989 | Sacco .......................... | 180/13 |
| 5,016,720 A | * | 5/1991 | Coker ......................... | 180/13 |
| 5,375,673 A | * | 12/1994 | McCall et al. ................ | 180/13 |
| 5,494,126 A | * | 2/1996 | Meeker ....................... | 180/13 |
| 6,702,051 B2 | * | 3/2004 | Chu et al. ..................... | 180/13 |
| 6,729,422 B2 | * | 5/2004 | Chu et al. ..................... | 180/13 |
| 6,779,616 B1 | * | 8/2004 | Brown ........................ | 180/13 |
| 6,945,343 B1 | * | 9/2005 | Moreau et al. ............... | 180/13 |
| 6,991,050 B1 | * | 1/2006 | Sanford et al. ............... | 180/13 |
| 7,108,090 B2 | * | 9/2006 | Turner ....................... | 180/65.5 |
| 2006/0042841 A1 | * | 3/2006 | Russell ........................ | 180/13 |

* cited by examiner

*Primary Examiner*—Tony Winner
(74) *Attorney, Agent, or Firm*—Ishman Law Firm P.C.

(57) ABSTRACT

A steerable drive assembly for local movement of a trailer includes an electric motor drive wheel unit having a drive wheel connected to the output shaft of a gear reduction unit. A steering shaft is connected to the drive wheel unit and an upper operating handle. The steering shaft is rotatably supported by a sleeve assembly that is attached to the tongue of the trailer. The operating handle includes a throttle coupled with the electric motor through a variable speed control for providing progressing power to the motor to enable speed variation without wheel slippage.

8 Claims, 6 Drawing Sheets

STEERABLE TRAILER DRIVE ASSEMBLY

RELATED APPLICATION

This application claims the benefit of U.S. Provisional Application No. 60/602,386 filed on Aug. 18, 2004.

FIELD OF THE INVENTION

The present invention relates to a motorized assembly for maneuvering a trailed vehicle from a hitched condition with a towing vehicle to an alternative location.

BACKGROUND OF THE INVENTION

After uncoupling from a towing vehicle, it is oftentimes necessary to reposition to a trailer for storage or unloading at subsequent locations. The trailer may remain loaded with goods and equipment and accordingly the required manual repositioning is difficult and tedious. In other instances, the trailer storage location may be congested preventing the towing vehicle from positioning the trailer, and again requiring manual repositioning. Moreover, the storage or use area may be contoured with unstable terrain composition.

Various motorized devices have been proposed for moving trailed vehicles to and from the towing vehicle. Electric motors with speed reduction have been proposed for the drive units. Development of the present invention has demonstrated that even with high ratio speed reduction units, wheel slippage occurs even on paved surfaces. On irregular surfaces, the wheel spin can lead to ruts that immobilize the trailer. Further, the motor starting torque causes a wheel speed surge resulting in positioning undershoot or overshoot making difficult trailer alignment in tight locations, such as at the hitch.

SUMMARY OF THE INVENTION

The present invention provides a compact steerable and motorized drive assembly that may be mounted on a trailer tongue to allow local transfer of the trailer to desired locations after uncoupling from the vehicle. The drive assembly includes a hand throttle controlled, variable speed drive wheel unit operated at an upper steering handle that allows the operator to accurately control wheel direction and wheel speed, without wheel slippage, on all terrain conditions from a normal walk-along position. The drive assembly includes a vertical, pivoting jack assembly that allows raising the trailer tongue from the towing hitch to an operative position for transit. For vehicle towing, the drive assembly may be jacked to a raised position, and optionally pivoted to a horizontal stowed position.

Accordingly, it is an object of the invention to provide a motorized drive assembly for a trailer that is operable under varying terrain conditions.

Another object of the invention is to provide a steerable motorized trailer drive assembly that may be accurately maneuvered under controlled variable speed conditions.

A further object of the invention is to provide a trailer drive assembly that may be removably incorporated on available trailer tongues without modification of the trailer.

DESCRIPTION OF THE DRAWINGS

The above and other objects and advantages of the invention will become apparent upon reading the following description taken in conjunction with accompanying drawings in which.

DETAILED DESCRIPTION OF THE PREFERRED EMBODIMENTS

Figure 2:
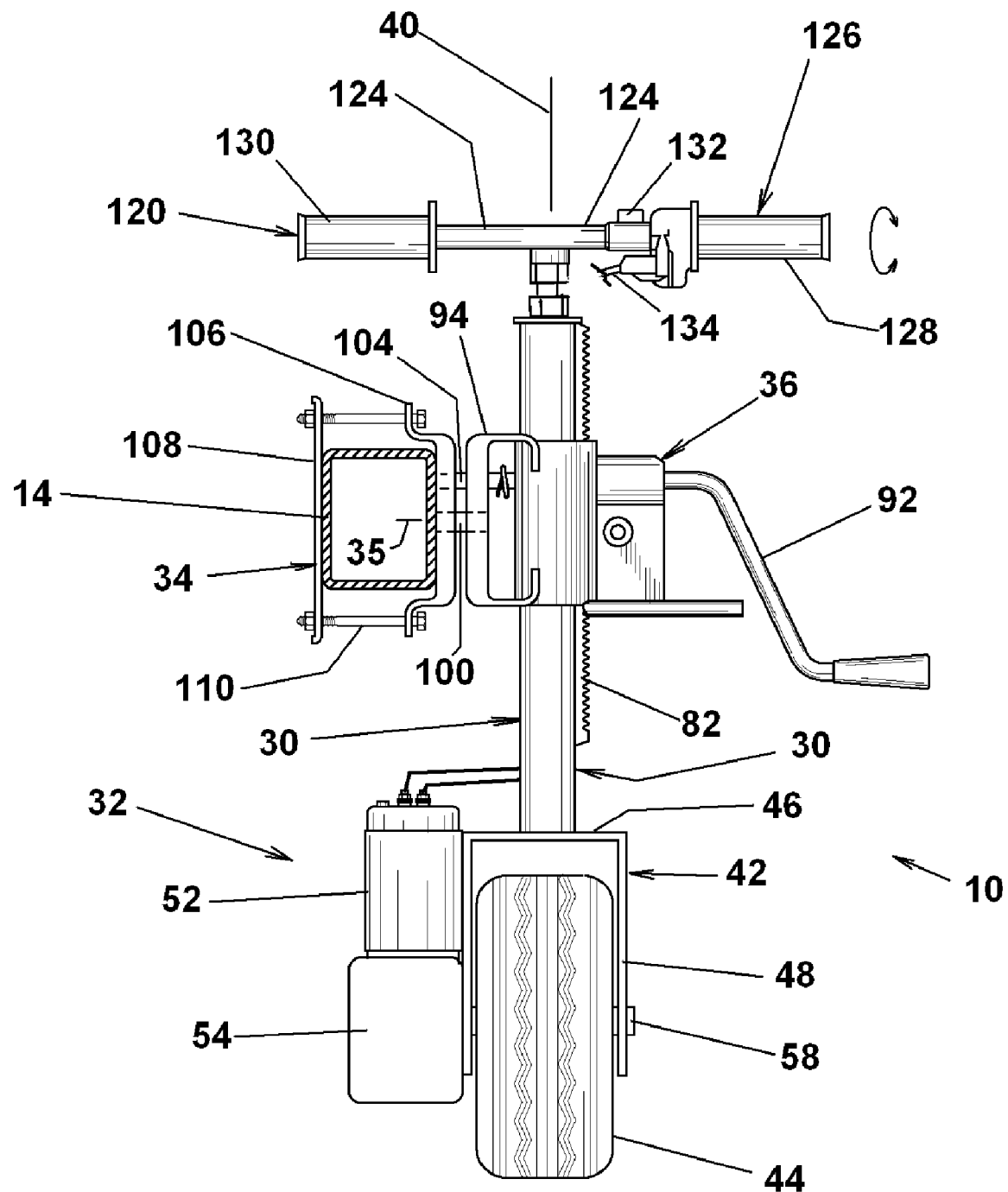
FIG. 2 is an enlarged front view of the drive assembly of FIG. 1.
Figure 3:
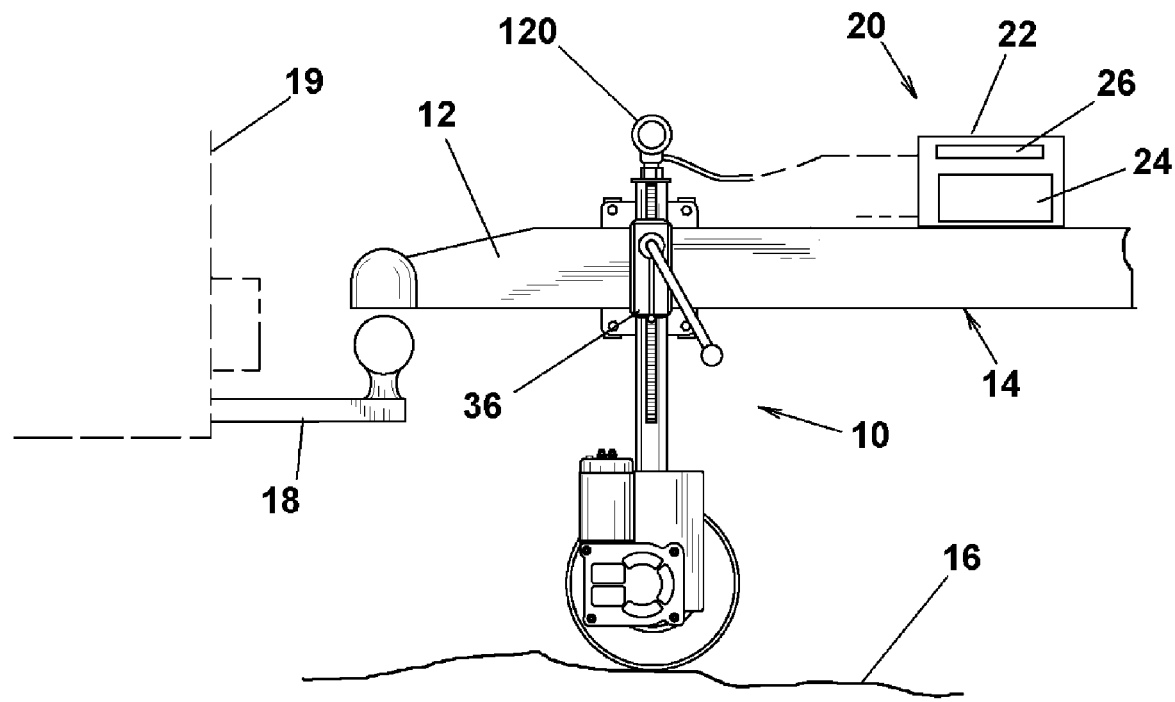
FIG. 3 is a side elevational view of the drive assembly with the trailer approaching a trailer hitch on a vehicle.
Figure 4:
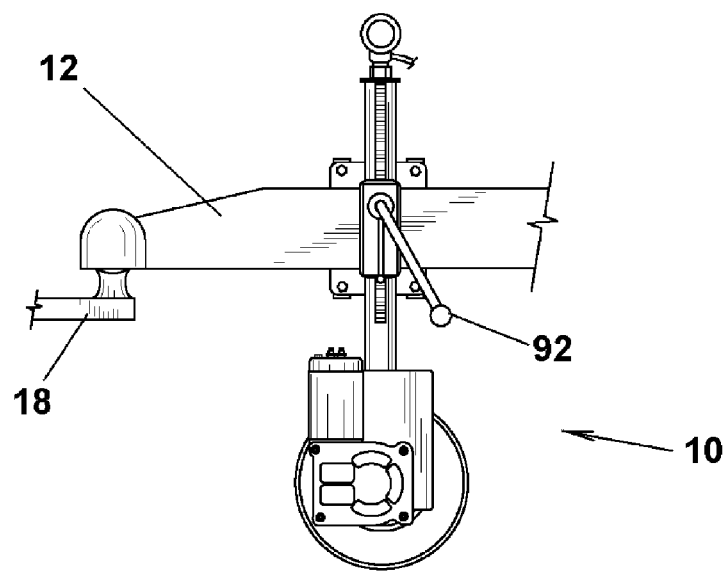
FIG. 4 is a side elevational view of the drive assembly of FIG. 1 with the trailer coupled with the trailer hitch.

Referring to FIGS. 3 and 4, a steerable drive assembly 10 is mounted on the tongue 12 of a trailer 14 for self-propelled movement about a terrain 16 and to and from a hitch 18 on a towing vehicle 19. The drive assembly 10 is operatively connected with a control system 20 mounted in a case 22 carried at a convenient location on the trailer 14. The control system 20 includes a battery 24 and a variable speed controller 26 for providing bidirectional speed control of the assembly 10 as described in greater detail below. The drive assembly 10 is vertically adjustable with respect to the tongue 12 to a raised position, not shown, during towing, and to lowered positions shown in FIGS. 1 and 2 to enable coupling and uncoupling with respect to the hitch 18. When uncoupled, the drive assembly 10 provides local transport over the terrain 16 with 360° steering capability and with infinite variable speed control thereby allowing full traverse of the local terrain.

Figure 1:
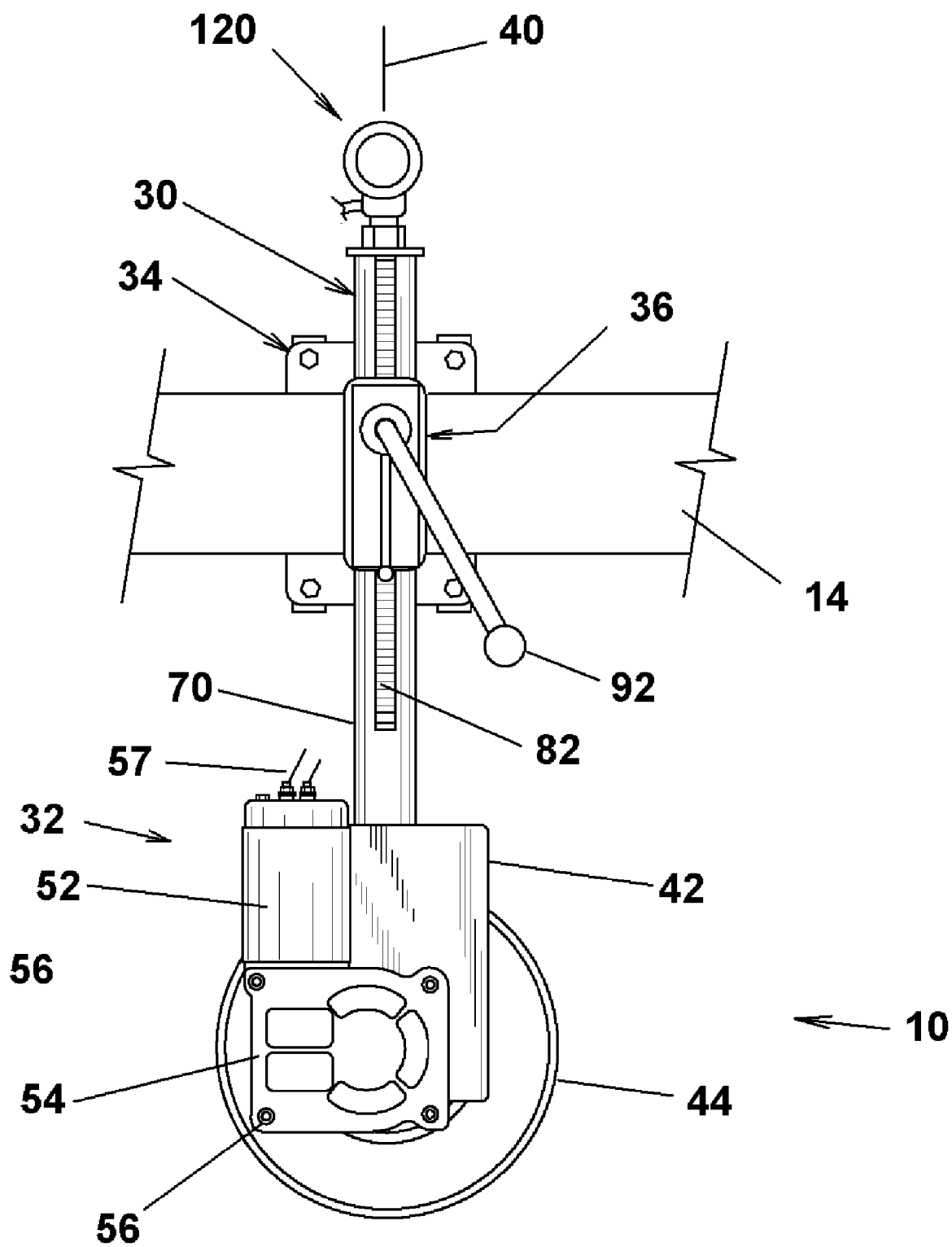
FIG. 1 is a side view of the steerable trailer drive assembly.

Referring to FIGS. 1 and 2, the drive assembly 10 comprises a support sleeve assembly 30 rotatably supporting a lower drive wheel unit 32. The sleeve assembly 30 is removably connected to the tongue 12 by clamp assembly 34. The clamp assembly 34 allows for convenient installation and removal as well as pivotal movement to a storage position.

The drive assembly 10 may be located adjacent a conventional trailer jack or in replacement thereof. Accordingly, the wheel assembly 10 may be mounted for local use on plural trailers for local transfer or be carried by the trailer 14 and pivoted about an upper transverse horizontal axis 35 to a horizontal position during vehicle towing. The wheel assembly 10 is provided with a jack unit 36 for raising and lowering the drive wheel unit 32.

Figure 5:
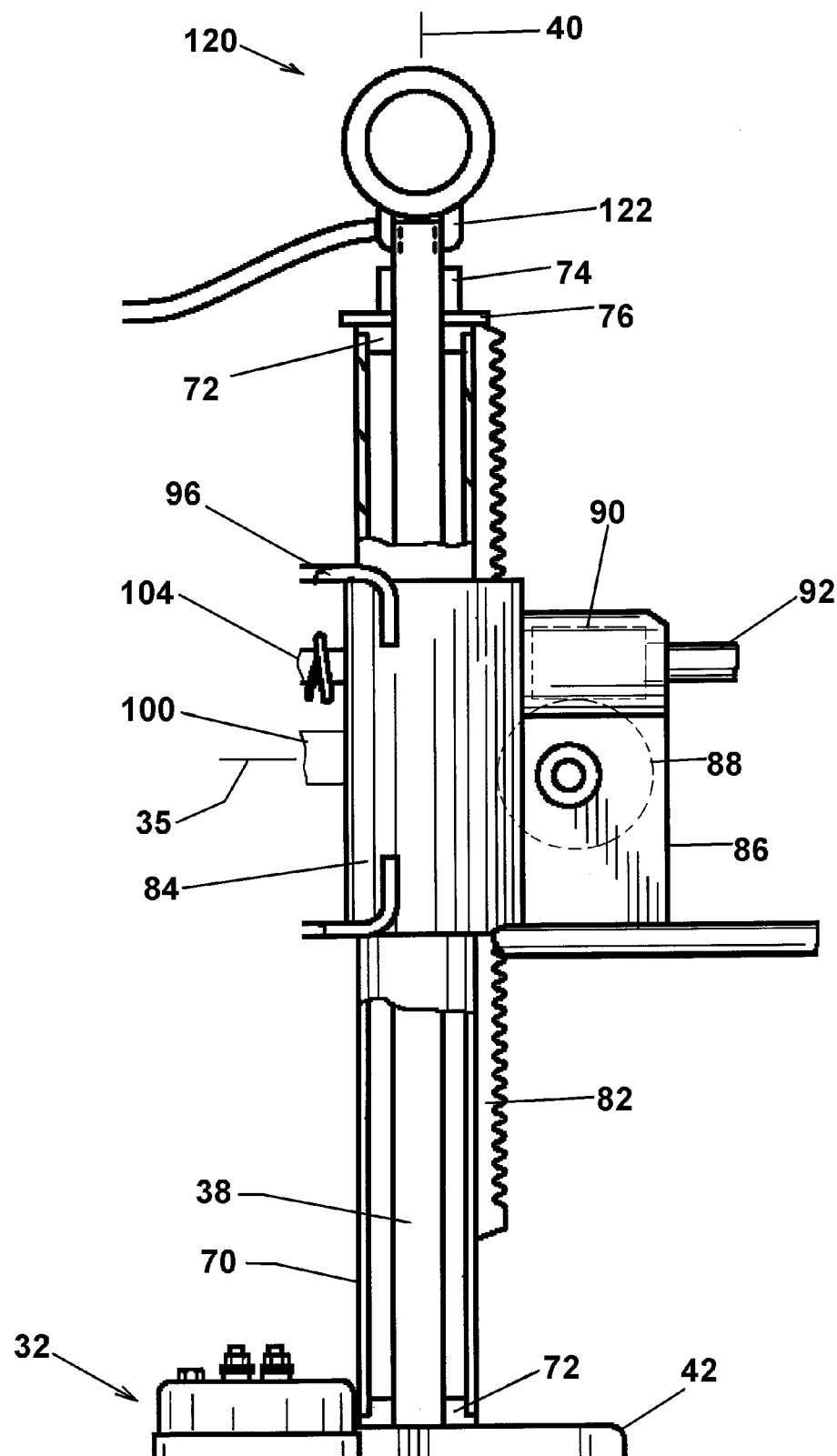
FIG. 5 is a fragmentary cross sectional view of the support sleeve assembly for the drive assembly.

Referring additionally to FIG. 5, the drive wheel unit 32 includes a steering shaft 38 journaled by the sleeve assembly 30 for 360° rotation about a vertical axis 40 and connected at a lower end to an inverted U-shaped yoke 42 operatively carrying a drive wheel 44. The yoke 42 includes a rectangular upper horizontal base 46 to which the lower end of the shaft 38 is attached, and a pair of laterally spaced side arms 48. A drive unit 32 includes an electric motor 52 and a gear reduction unit 54 is attached to the exterior of the inner side arm 48 by fasteners 56. The motor 52 is connected to the control unit 20 by leads 57 that may be routed exterior or interior of the sleeve assembly 30. Further, a clutch brake is preferably incorporated on the drive unit 32 for preventing wheel rotation at cessation of voltage.

Figure 6:
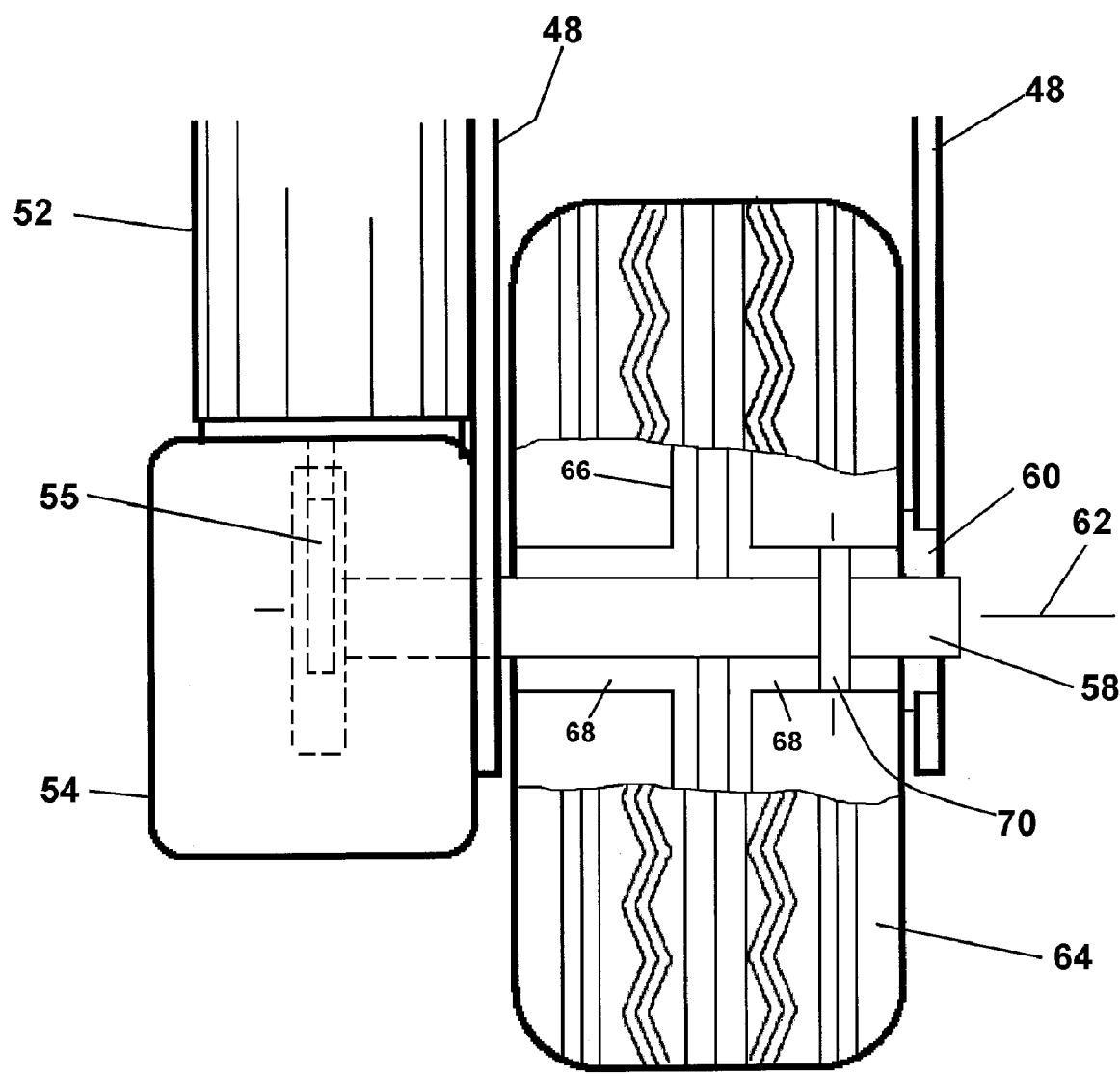
FIG. 6 is a fragmentary cross sectional view of the drive wheel unit.

As shown in FIG. 6, the gear reduction unit 54 includes an outwardly extending output shaft 58 journaled at bearings 60 carried in horizontally aligned apertures in the side arms 48 for rotation about a lower horizontal axis 62. The drive wheel 44 includes a pneumatic tire 64 having a rim and hub 66. A split flange assembly 68 includes hubs having transverse bores receiving the output shaft 58 and operatively connected thereto by drive pin 70. The gear reduction unit 54 includes a worm gear unit 55 having a reduction ratio of about 40:1 to 100:1. The motor 52 is a bidirectional variable speed unit. The worm gear unit provides a right angle drive allowing compact vertical orientation limiting the lateral projection. A suitable unit is the direct drive motor from Donovan Enterprises of Stuart Fla. The drive unit when coupled to the variable speed control to be described below allows for infinite speed control to enable accurate movement of the trailer, without wheel spin, regardless of terrain contour or composition. Testing of the invention with such a drive unit provides a maximum ground speed of about 2 miles per hour and incremental direction control of about ¼ inch.

Referring to FIG. 5, the sleeve assembly 30 includes a vertical cylindrical tube 70 through which the shaft 30 coaxially extends. Bearings 72 are mounted at the upper and lower ends of the tube 70 surrounding the shaft 38. The upper end of the shaft 38 is threaded. A lock nut 74 and washer 76 are assembled over the threaded upper end of the shaft resulting in a rotatable connection accommodating 360° relative rotation between the sleeve assembly 30 and the drive unit 32.

Referring to FIGS. 2 and 5, the jack unit 36 comprises a crank operated jack assembly 80 that drivingly engages a vertically extending rack 82 attached to the outer surface of the tube 70. The jack assembly 80 includes a collar 84 slidably surrounding the tube 70 and a drive housing 86 having a worm wheel gear 88 driving engaging the rack 82 and driven by a worm 90 operatively connected to a crank arm 92. In a conventional manner, rotation of the crank arm 92 is operative to raise and lower the support assembly relative to the tongue mounted jack assembly.

The inner end of the jack collar 84 includes a rotatable mount assembly 94 for removable mounting on the tongue of the trailer. The mount assembly 94 includes a bracket 96 attached to the inner side of the tube 70. The bracket 96 is pivotally connected the clamp assembly 34 by a pin connection 100 for rotation about the upper horizontal axis 35. A spring biased lock pin 104 carried on the bracket 96 engages cross holes in the inner clamp plate 106 of the clamp assembly to enable selective pivoting of the support sleeve about the axis between a vertical operative position and a horizontal stowed position.

The clamp assembly 34 includes the inner clamp plate 106 that engages one lateral surface of the trailer tongue 12 and an outer clamp plate 108 that engages the opposed lateral surface of the tongue, the plates being interconnected by threaded fasteners 110 whereby the assembly may be removably attached to the trailer. Alternatively, the jack housing may be fixedly attached to the tongue by suitable fasteners.

As shown in FIG. 2, a T-bar operating handle 120 includes a center threaded hub 122 and laterally extending arms 124. The hub 122 is connected to the upper end of the shaft 38 (FIG. 5). A throttle assembly 126 having a rotatable throttle grip 128 is carried at the outer end on one of the arms 124 and a stationary handgrip 130 is carried at the outer end of the other arm. An on/off switch 132 is carried on the handle for controlling assembly operation. The switch 132 may be key operated. The throttle assembly 126 and switch 132 are connected to the control system 20 by leads 134. Preferably, the throttle assembly 126 provides bidirectional control, whereby rotation of the throttle grip 128 in one direction controls forward movement and rotation in the other direction controls reverse movement. Further, the extent of rotation is interfaced with the speed controller 24 in control unit 20 to infinitely control wheel speed to prevent power surges tending to spin the drive wheel. A suitable throttle assembly is commercially available from Magura 5K Ohm Twist Throttle Product No. THR-MAG5K. Alternatively, a rotatable throttle or lever actuated throttle may be used in conjunction with a multiple position operating switch for providing for on/off status as well as forward/reverse status.

Figure 7:
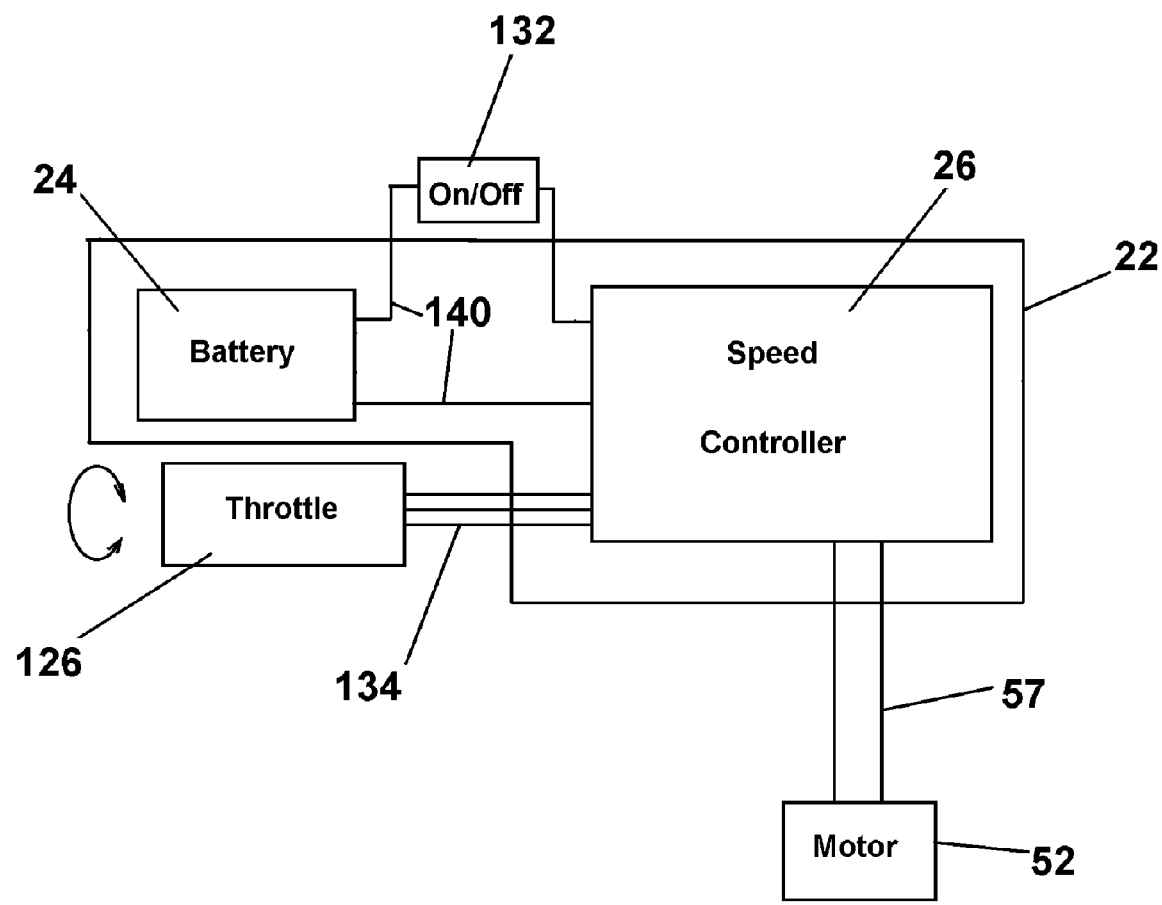
FIG. 7 is a schematic diagram of the control system for the trailer drive assembly.

Referring to FIG. 7, the control unit 20 is mounted at a convenient location on the trailer 14 and connected by the cables 57, 134 to the drive unit 32 and the throttle assembly 126. The battery 22 is electrically connected through the operating switch 132 and the speed controlled by leads 140, 142. The throttle assembly 126 is operatively connected with the speed regulator 126, and with the electric motor 52 for manually varying motor speed. A suitable speed regulator is the NCC Professional 120 4 Quardrant Vehicle Controller available from 4QD For removal from a tow vehicle as shown in FIGS. 3 and 4, the jack assembly 36 is actuated through the crank 92 to lower the drive wheel and raise the tongue above the hitch. Thereafter, the switch 132 is closed and the throttle progressive reversely rotated to back the trailer 14 from the vehicle. For travel thereafter, the operator control the driving speed at the throttle and the steering effected by rotation of the handle. Testing has demonstrated that drive assembly can traverse, without wheel spinning, severely undulating terrains of loosely compacted materials. The drive assembly with the fully rotatable steering allows the vehicle to be moved to locations with high accuracy in positioning.

For heavier applications such as construction trailers or camping trailers, the electric motor may be replaced with a gas powered hydraulic motor.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed is:

1. A steerable drive assembly for local movement of a trailed vehicle comprising: a drive wheel unit including a bidirectional electric motor operatively coupled with a gear reduction unit having an output shaft supporting a drive wheel for rotation about a lower horizontal axis; a vertical steering shaft connected at a lower end to said drive wheel unit and carrying a transverse operating handle at an upper end; a support sleeve assembly rotatably supporting said steering shaft for rotation about a vertical axis; mounting means for connecting said support sleeve assembly to the trailed vehicle; jack means operative by a crank member for raising and lowering said sleeve assembly relative to said mounting means about said vertical axis; a throttle assembly carried on said operating handle manually controlled by an operator, said throttle assembly including a throttle member that is progressively rotated to effect a desired speed; a control unit adapted to be carried on the trailed vehicle, said control unit including a variable speed controller and a battery, said variable speed controller and said battery being operatively interfaced with said throttle assembly and said drive unit for effecting said desired speed for the local movement of the trailed vehicle; and reversing means operative between said control unit and said electric motor for changing the rotation direction of said output shaft to provide elective forward and reverse movement to said drive wheel.

2. The steerable drive assembly as recited in claim 1 wherein said throttle is bidirectionally rotatable and interfaced with said reversing means to provide said elective forward and reverse movement.

3. The steerable drive assembly as recited in claim 2 including switch means on said operating handle for enabling and disabling said control unit.

4. The steerable drive assembly as recited in claim 1 wherein said jack means includes a rack member vertically attached to said sleeve assembly and engaged by a gear member operated by said crank member for effecting said raising and lowering.

5. The steerable drive assembly as recited in claim 4 wherein said mounting means includes pivot means for pivoting said sleeve assembly about an upper horizontal axis.

6. The steerable drive assembly as recited in claim 1 wherein said gear reduction unit utilizes a worm gear drive.

7. The steerable drive assembly as recited in claim 6 wherein said control unit is housed in a case member carried on the trailed vehicle.

8. A steerable drive assembly for local movement of a trailed vehicle having a tongue adapted to be connected at a hitch in a hitched condition to a towing vehicle, said steerable drive assembly comprising: a drive wheel unit including a bidirectional electric motor operatively coupled with a gear reduction unit having an output shaft supporting a drive wheel for rotation about a lower horizontal axis; a vertical steering shaft connected at a lower end to said drive wheel unit and carrying a transverse operating handle at an upper end; a support sleeve assembly rotatably supporting said steering shaft for 360° rotation about a vertical axis; a mounting clamp attached to said sleeve assembly and adapted for removable connection to the tongue adjacent said hitch; means operative between said sleeve assembly for raising and lowering said drive wheel relative to said mounting clamp to enable raising the tongue from the hitched condition or raising said drive wheel relative to said mounting clamp to enable transit of the towing vehicle and trailing vehicle; a throttle assembly carried on said operating handle manually controlled by an operator, said throttle assembly being progressively actuated in accordance with a desired speed; a control unit adapted to be carried on the trailed vehicle, said control unit including a variable speed controller and a battery, said variable speed controller and said battery being operatively interfaced with said throttle assembly and said drive unit for effecting said desired speed for the local movement of the trailed vehicle; and reversing means operative between said control unit and said electric motor for changing the rotation direction of said output shaft to provide elective forward and reverse movement to said drive wheel.

* * * * *